United States Patent Office 3,137,851
Patented June 16, 1964

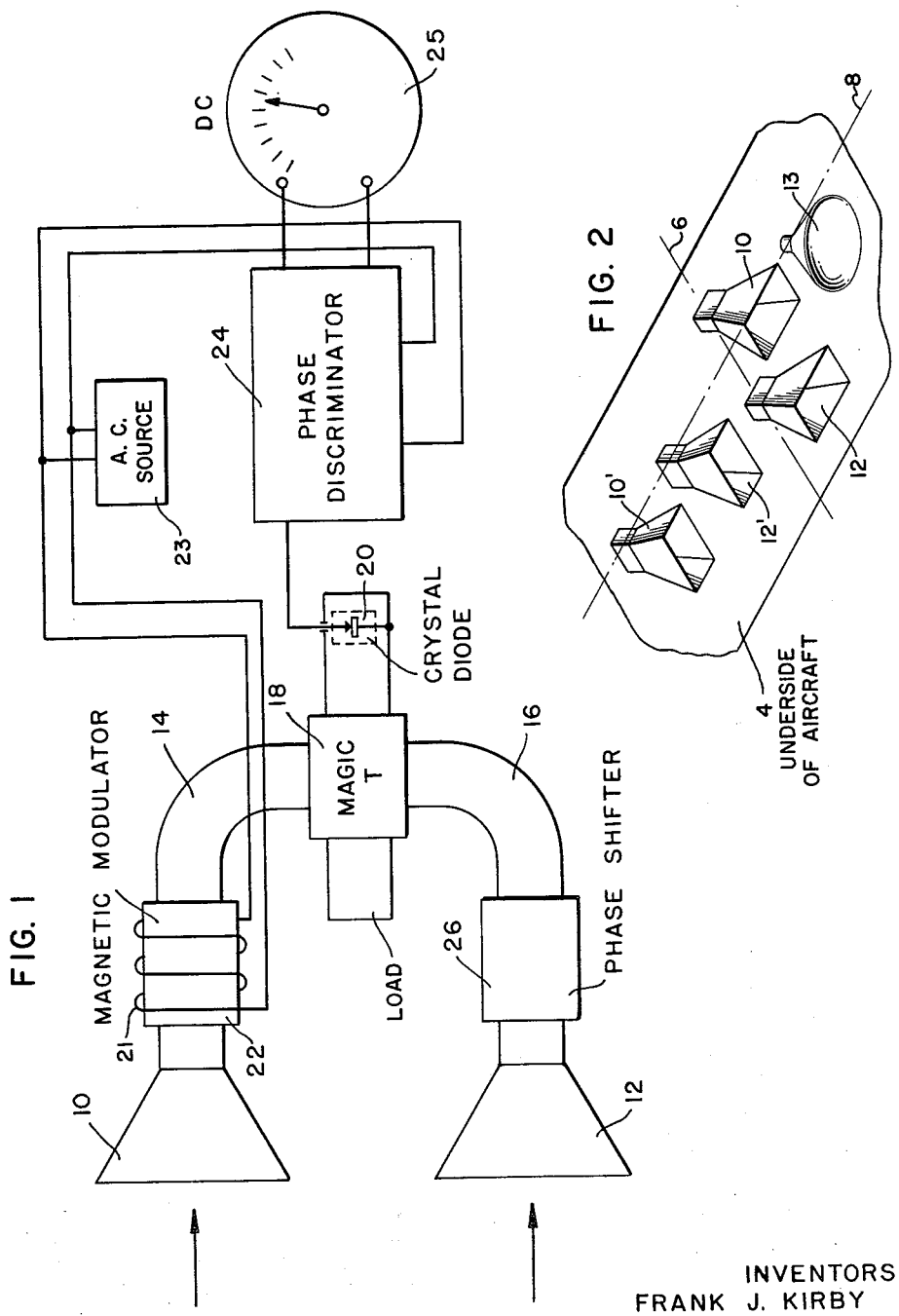

3,137,851
GYRO VERTICALITY INTERFEROMETER
Frank J. Kirby and John C. Keyes, China Lake, Calif., assignors to the United States of America as represented by the Secretary of the Navy
Filed Mar. 7, 1957, Ser. No. 644,702
1 Claim. (Cl. 343—16)
(Granted under Title 35, U.S. Code (1952), sec. 266)

The invention described herein may be manufactured and used by or for the Government of the United States of America for governmental purposes without the payment of any royalties thereon or therefor.

The present invention is related to the testing of gyros, and more particularly concerns a novel system for indicating aircraft deviation from normal attitude in roll and pitch modes, and thus additionally useful for checking accuracy of airborne vertical-indicating gyros under actual flight conditions.

Vertical-indicating gyros, often simply termed vertical gyros, have found numerous applications where continuous determination of a vertical reference axis is essential to accurate operation of indication, control or stabilization systems, for example in the aviation field. The present invention is directly intended for checking accuracy of vertical gyros operating in connection with indicating instruments which display aircraft roll and pitch attitudes.

A prior art method and apparatus for checking accuracy of airborne vertical gyros involves the use of a light source mounted on the aircraft, and a telescope mounted on the gyro, in such manner that reflection of the light source from an underlying body of water can be telescopically detected when the aircraft is flown in precisely normal attitude corresponding to a condition in which the aircraft yaw axis, perpendicular to the roll and pitch axes, is truly vertical. In practice, however, such method and apparatus employing light reflection technique presents a number of disadvantages, including the requirement for an essentially undisturbed water surface, often not available.

The present invention overcomes disadvantages of such prior art methods and provides a system which checks aircraft attitude in two modes, specifically in roll and in pitch, and correspondingly checks vertical gyro accuracy of verticality indication, involving microwave radar apparatus employing two pairs of horn antennae directed downwardly and mounted along axes parallel to the roll and pitch axes.

In accordance with the foregoing, an object of the invention is the provision of an improved system for indicating aircraft attitude, for use in testing the verticality indication of airborne gyroscopes.

Another object of the invention is to provide a more practical, accurate and easier to use system for testing the verticality indication of gyros.

A further object of the invention is to provide a verticality-determining interferometer system using a radar source.

Other objects and many of the attendant advantages of the present invention will become apparent as the same becomes better understood from the following detailed description when considered in conjunction with the accompanying drawing wherein:

FIG. 1 is a schematic diagram of an improved microwave radar interferometer apparatus for determination of aircraft attitude in either roll or pitch mode, depending upon positioning of the horn antennae; and FIG. 2 illustrates the manner in which a transmitting antenna and two pairs of receiving horn antennae, each pair associated with interferometer apparatus as in FIG. 1, are mounted upon the underside of an aircraft for determination of aircraft attitude in roll and pitch modes, and thus also for checking vertical indicating gyro accuracy, in accordance with the present invention.

It is to be understood that the microwave radar interferometer or aircraft attitude detection apparatus (FIG. 1) used in each of the modes may be identical, each employing a pair of receiving horn antennae mounted on the underside 4 (FIG. 2) of the aircraft, differing only as to whether the pair of horn antennae is positioned along an axis 6 parallel to the lateral (pitch) axis or along an axis 8 parallel to the longitudinal (roll) axis, and together forming a verticality detection apparatus. Since the horn antennae 10, 12 are shown as positioned along the axis 6 which deviates from horizontal upon occurrence of roll, the interferometer shown in FIG. 1 and indicated as employing these horn antennae 10, 12 serves to provide an indication of aircraft attitude in roll. A like interferometer employing the horn antennae 10' and 12' positioned along the axis 8 would serve to provide an indication of aircraft attitude in pitch. Associated with the verticality detection apparatus is a microwave radar signal source (not shown) feeding a so-called dish antenna 13, the latter also being mounted on the underside 4 of the aircraft, as indicated, to project its transmission beam downwardly. The resultant illumination of any body of water, underlying the aircraft, gives rise to microwave echo signals which are utilized by the verticality detection apparatus as will appear.

Referring now to FIG. 1 of the drawing in particular, the two horn antennae, in this instance 10 and 12, are connected by suitable wave guides 14 and 16 to a wave guide hybrid junction or "magic-T" 18. The hybrid junction 18 is here employed in a manner, well known in the microwave art, yielding a resultant or output signal corresponding to the vectorial difference, preferably, of the pair of microwave signals as delivered via wave guides 14 and 16 to the junction 18. This diffference output of the hybrid junction 18 is in turn detected by a crystal detector 20.

Wave guide 14 is provided with a magnetic modulator 22, a conventional unit generally of ferrite type, having a winding 21 to which is applied a modulation control voltage delivered by an A.C. source 23 as indicated, and operating to impose phase-modulation upon the microwave signal delivered by wave guide 14 to hybrid junction 18. This phase-modulation takes place at the frequency of the modulation control voltage, say at 400 c.p.s. (cycles per second) as is characteristic of A.C. sources available in aircraft. The output of the hybrid junction 18, accordingly, is a microwave signal carrying amplitude-modulation as a result of the vectorial combination of the phase-modulated microwave signal in wave guide 14 and the microwave signal in wave guide 16, this amplitude-modulation being at the frequency of the modulation control voltage, 400 c.p.s. in this instance. Operating in a manner well known in the microwave art, crystal detector 20 functions to extract from the resultant amplitude-modulated microwave signal, and to apply to a phase-sensitive detector or phase discriminator 24, a demodulation signal of waveform corresponding to the amplitude-modulation carried by the hybrid-junction resultant microwave signal. Phase discriminator 24 may be of any conventional type (for example that shown at page 76 of "Servo-mechanism Practice," W. R. Ahrendt, published 1954 by McGraw-Hill Book Co.) adapted to effect phase comparison of an input signal, in this instance the demodulation signal, relative to a supply or reference signal likewise provided by A.C. source 23 as indicated, and to correspondingly operate meter 25 to provide a positive or negative indication dependent upon the phase-correspondence or phase-opposition condition of the demodulation signal relative to the reference signal. The phase condition of the demodulation signal is in turn dependent upon the phase of the microwave signal as received by horn antenna 10 relative to that as received by horn antenna 12, as will appear.

Phase shifter 26 is included in the wave guide 16, as indicated, in order to oppose and cancel any imbalance in the two horn antennae and wave guide channels feeding the hybrid junction 18, such as that which may be introduced by insertion of magnetic modulator 22, and to set or calibrate the apparatus to insure that positive and negative meter indications are provided for differing sense of relative phase conditions of microwave signals as received at the horn antennae 10 and 12, and correspondingly a null or zero meter indication for an equi-phase condition of these microwave signals as received at the horn antennae.

Relative to a given cycle of operation of magnetic modulator 22 providing a sequence of say advance and retardation actions upon the microwave signal delivered to hybrid junction 18 via wave guide 14, the resultant effect, upon a microwave signal received by horn antenna 10 in a phase-leading condition relative to that received by horn antenna 12, is to first increase and then decrease its phase-lead as delivered via wave guide 14 to junction 18, relative to the microwave signal as delivered via wave guide 16 to junction 18. Conversely, the resultant effect, upon a microwave signal received by horn antenna 10 in a phase-lagging condition relative to that received by horn antenna 12, is to first decrease and then increase its phase-lag as delivered via wave guide 14 to junction 18, relative to the microwave signal as delivered via wave guide 16 to junction 18. In consequence, the amplitude-modulation carried by the resultant microwave signal delivered by hybrid junction 18 to detector 20, and the amplitude-modulation signal extracted by detector 20 and delivered to phase discriminator 24, is either in say phase-correspondence or phase-opposition with the reference signal applied to phase discriminator 24, dependent upon the phase lag or lead condition of the microwave signal as received by horn antenna 10 relative to that as received by horn antenna 12. Accordingly, phase discriminator 24 actuates meter 25 to provide a positive or negative (or equivalent) indication corresponding to the sense of the relative phase condition of the received microwave signals, or an intermediate null or zero indication corresponding to an equi-phase condition of the received microwave signals.

In view of the foregoing it will now be apparent that a meter 25 null reading is indicative of a horizontal condition of the pitch axis parallel to axis 6 along which the horn antennae 10 and 12 are positioned, and further indicative of a vertical condition of a plane containing the yaw and roll axes. Similarly, a horizontal condition of the roll axis and correspondingly a vertical condition of a plane containing the yaw and pitch axes is readily determined by means of like interferometer apparatus including the other pair of horn antennae 10' and 12' mounted and positioned as described. A simultaneous condition of null in both modes of detection is thus indicative of normal aircraft attitude in both roll and pitch and correspondingly indicative of a true vertical condition of the aircraft yaw axis perpendicular to the roll and pitch axes, serving to provide a reference against which vertical gyro indication can be checked.

Obviously many modifications and variations of the present invention are possible in the light of the above teachings. It is therefore to be understood that within the scope of the appended claim the invention may be practiced otherwise than as specifically described.

What is claimed is:

In combination:
(a) an aircraft;
(b) microwave signal transmission means carried by said aircraft and operative to illuminate an underlying area of a body of water when overflown by said aircraft;
(c) microwave signal interferometer apparatus carried by said aircraft and including first and second pairs of horn antennae mounted on said aircraft for reception of microwave signals reflected from said underlying water area;
(d) said first pair of horn antennae being spaced along a normally horizontal axis parallel to the pitch axis of said aircraft and facing said underlying water area to receive a first pair of reflected microwave signals characterized by a relative phase condition corresponding to deviation of said pitch axis from horizontal attitude;
(e) said second pair of horn antennae being spaced along a normally horizontal axis parallel to the roll axis of said aircraft and facing said underlying water area to receive a second pair of reflected microwave signals characterized by a relative phase condition corresponding to deviation of said roll axis from horizontal attitude; and
(f) said microwave signal interferometer apparatus further including means responsive to the relative phase conditions of said first and second pairs of reflected microwave signals to provide indications of the sense and magnitude of said deviations of said aircraft pitch and roll axes from horizontal attitude.

References Cited in the file of this patent

UNITED STATES PATENTS

| | | |
|---|---|---|
| 2,148,267 | Honore | Feb. 21, 1939 |
| 2,474,268 | Marchand | June 28, 1949 |
| 2,510,692 | Goddard | June 6, 1950 |
| 2,523,398 | Southworth | Sept. 26, 1950 |
| 2,568,250 | O'Brien | Sept. 18, 1951 |
| 2,701,875 | Baltzer | Feb. 8, 1955 |
| 2,914,762 | Gross et al. | Nov. 24, 1959 |
| 2,923,006 | Vernhes et al. | Jan. 26, 1960 |
| 3,005,199 | Grandsard | Oct. 17, 1961 |

OTHER REFERENCES

Page: Monopulse Radar, I.R.E. 1955 Convention Record, vol. 3, part 8, pp. 132–134.